United States Patent
Neoh

(10) Patent No.: US 11,928,443 B2
(45) Date of Patent: Mar. 12, 2024

(54) TECHNIQUES FOR TRANSPOSING A MATRIX USING A MEMORY BLOCK

(71) Applicant: Intel Corporation, Santa Clara, CA (US)

(72) Inventor: Hong Shan Neoh, San Carlos, CA (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 16/721,458

(22) Filed: Dec. 19, 2019

(65) Prior Publication Data

US 2020/0125335 A1  Apr. 23, 2020

(51) Int. Cl.
*G06F 7/78* (2006.01)

(52) U.S. Cl.
CPC .................................... *G06F 7/78* (2013.01)

(58) Field of Classification Search
CPC ........................................................ G06F 7/78
See application file for complete search history.

(56) References Cited

U.S. PATENT DOCUMENTS

| 5,014,235 A * | 5/1991 | Morton ............... G06F 17/16 365/185.11 |
| 5,481,487 A * | 1/1996 | Jang .................. G06F 17/147 708/401 |
| 5,910,794 A * | 6/1999 | Schneider ............. G06T 3/606 358/1.14 |
| 7,669,014 B2 | 2/2010 | Tuominen |
| 10,031,846 B1 * | 7/2018 | Finn .................... G06F 7/78 |
| 2004/0215683 A1 * | 10/2004 | Beaumont ......... G06F 15/8023 712/E9.034 |
| 2018/0188972 A1 | 7/2018 | Yang et al. |
| 2020/0241844 A1 * | 7/2020 | Koeplinger ............ G06F 5/08 |
| 2020/0409664 A1 * | 12/2020 | Li ......................... G06F 7/50 |

* cited by examiner

*Primary Examiner* — Farley Abad
(74) *Attorney, Agent, or Firm* — InventIQ Legal LLP; Steven J. Cahill

(57) ABSTRACT

A circuit system includes a memory block and first and second processing circuits. The first and second processing circuits store a matrix in the memory block by concurrently writing elements in first and second rows or columns of the matrix to first and second regions of storage in the memory block, respectively. The first and second processing circuits transpose the matrix to generate a transposed matrix by concurrently reading elements in first and second rows or columns of the transposed matrix from third and fourth regions of storage in the memory block, respectively.

20 Claims, 8 Drawing Sheets

TECHNIQUES FOR TRANSPOSING A MATRIX USING A MEMORY BLOCK

FIELD OF THE DISCLOSURE

The present disclosure relates to electronic circuits, and more particularly, to techniques for transposing a matrix using a memory block.

BACKGROUND

In linear algebra, the transpose of a matrix is an operation that switches the rows and columns of the matrix to generate a transposed matrix. A transpose operation rearranges the rows of a matrix as columns and the columns of the matrix as rows. The transpose of a matrix can be achieved, for example, by writing the rows of the matrix as the columns of the transposed matrix or by writing the columns of the matrix as the rows of the transposed matrix. The transpose of a matrix is used in various applications from generic matrix operations to multi-dimensional fast Fourier transforms (FFTs).

DETAILED DESCRIPTION

According to some embodiments disclosed herein, efficient transpose operations of matrices are performed that use a memory block and two or more processing circuits operating in parallel in an integrated circuit device or circuit system. The processing circuits store a matrix in the memory block by writing elements in rows or columns of the matrix to rows or columns of storage in the memory block in parallel. The processing circuits transpose the matrix to generate a transposed matrix by reading elements in rows or columns of the transposed matrix from rows or columns of storage in the memory block in parallel. These techniques can take advantage of abundant memory bandwidth in the local memory blocks of some types of integrated circuits, such as programmable logic integrated circuits, in order to create a stall-free transpose operation without replicating memory content. The memory block can be segmented into smaller memory circuits to increase the overall memory bandwidth, as described in further detail herein.

A 3 dimensional fast Fourier transform is one example of an algorithm that transposes one or more matrices. The 3 dimensional (3D) fast Fourier transform (FFT) is separable, such that the 3 dimensional FFT can be expressed as 3 FFTs using three 1 dimensional (1D) fast Fourier transforms (FFTs), as shown in the equation below. Each of these 1 dimensional FFTs can be computed efficiently using the properties of the FFT.

$$F(k_x, k_y, k_z) = \sum_z \left[ \sum_y \left[ \sum_x f(x, y, z) e^{\frac{-i2\pi k_x x}{N_r}} \right] e^{\frac{-i2\pi k_y y}{N_c}} \right] e^{\frac{-i2\pi k_z z}{N_p}}$$

Dimensional decomposition can be employed to compute the N-point 3D FFT by evaluating $3N^{2-}$ N-point 1D FFTs. The steps to perform such a computation on a 2D processing array include performing a two dimensional FFT along the two local dimensions by first performing a 1D FFT, performing a local transpose on the matrix, and then performing a second 1D FFT. Subsequently, a global transpose is performed on the matrix and then a final 1D FFT is performed to complete the 3D FFT.

Figure 1:
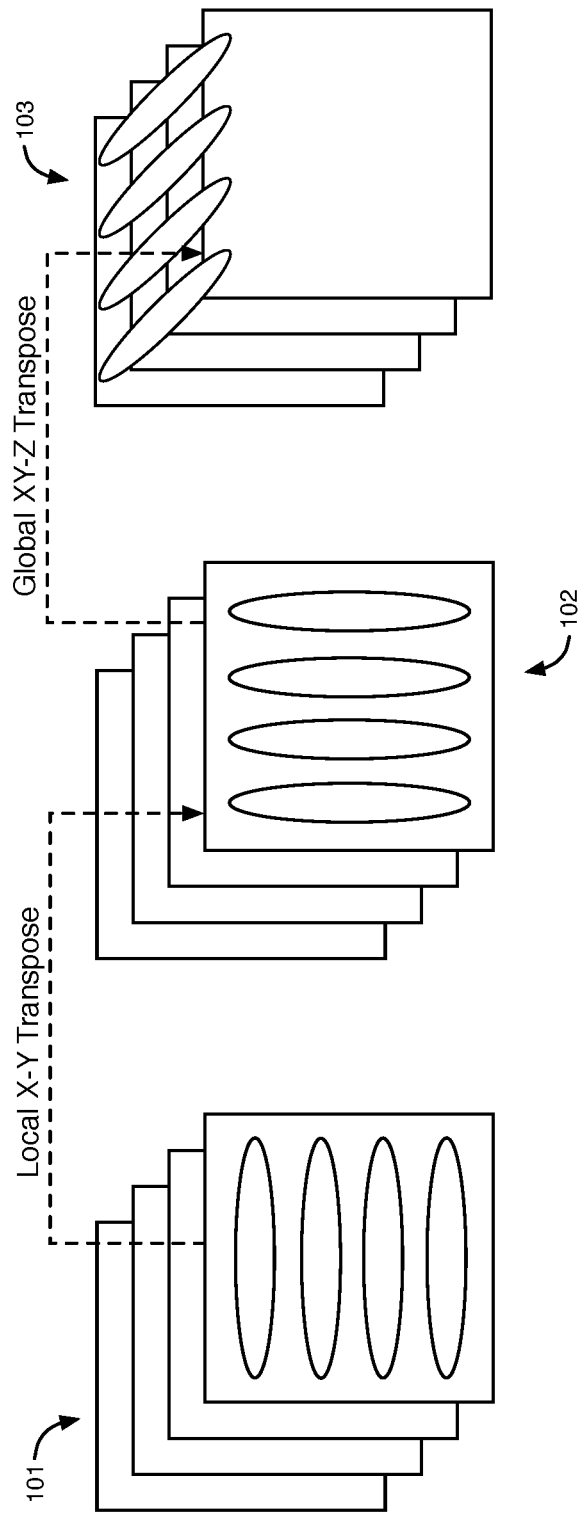
FIG. 1 graphically illustrates examples of local X-Y transpose and global XY-Z transpose operations that can be performed by a 3 dimensional fast Fourier transform.

The 3D FFT performs two types of transpose operations: a local X-Y transpose and a global XY-Z transpose. FIG. 1 graphically illustrates examples of the local X-Y transpose and the global XY-Z transpose operations that can be performed by a 3 dimensional fast Fourier transform, according to an embodiment. In the example shown in Figure (FIG. 1, the first local X-Y transpose operation transposes the rows of the matrices 101 in the first FFT dimension (e.g., in the X-dimension) to columns of the matrices 102 in the second FFT dimension (e.g., in the Y-dimension). The local X-Y transpose operation can, for example, be implemented locally using the on-chip memory available within an integrated circuit, such as a field programmable gate array (FPGA). The global XY-Z transpose operation is a larger corner turn operation that transposes the columns of the matrices 102 in the second FFT dimension (e.g., in the Y-dimension) to layers of the matrices 103 in the third FFT dimension (e.g., in the Z-dimension), as shown in FIG. 1. The global transpose operation of an N×N matrix can, for example, be implemented globally using off-chip memory for a large FFT size (e.g., N>64), where N is the FFT size.

The transpose operation is a rate limiting step of the 3D FFT, which can adversely impact fast parallel implementations of the 3D FFT on large clusters. Therefore, in order to obtain the maximum advantage of the parallel processing provided by an FPGA, the data can be rearranged in advance to make the data local for the dimension to be transformed, while the basic 1D FFT computation is performed in each of the 3 dimensions, as illustrated graphically in FIG. 1.

Figure 2:
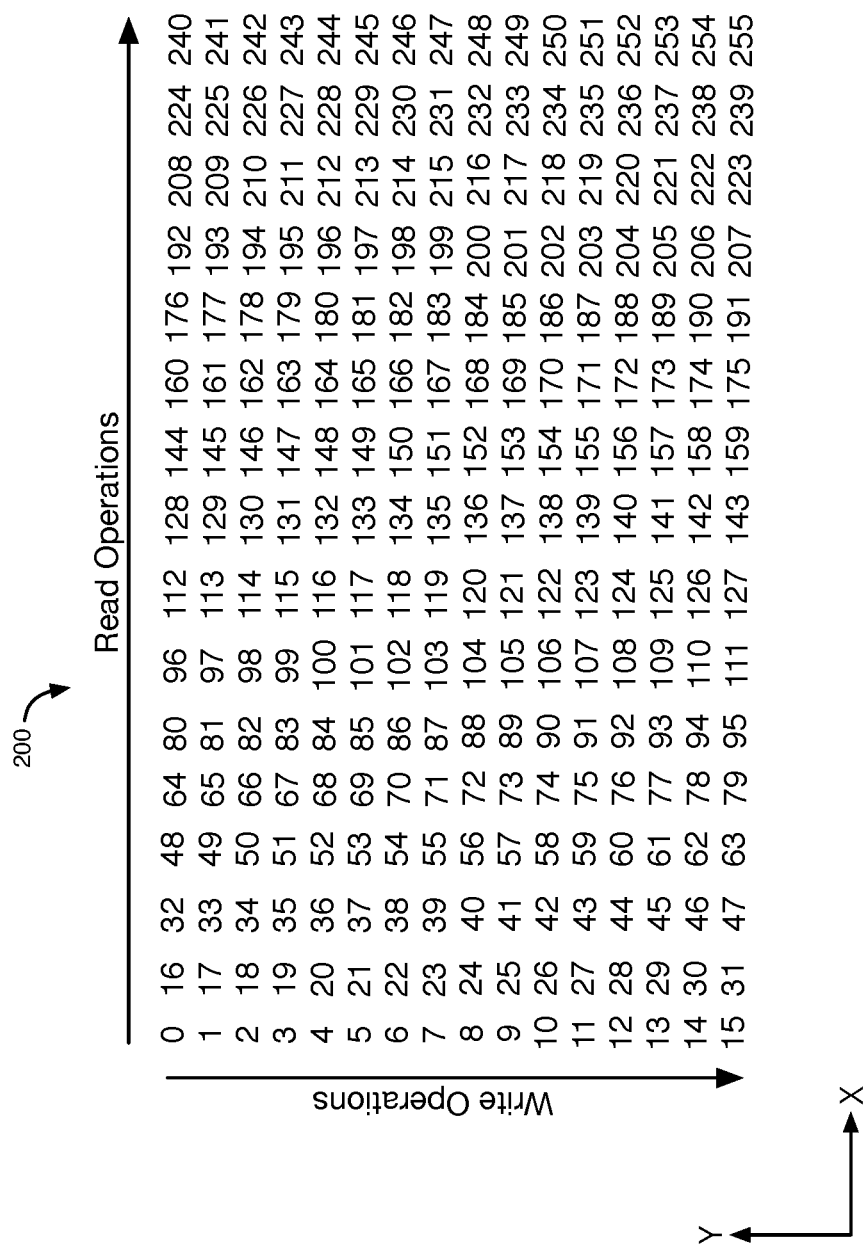
FIG. 2 illustrates an example of a 16×16 matrix that can be transposed for a two dimensional (2D) fast Fourier transform (FFT) engine operating on a processing circuit.

The first local X-Y transpose operation of an N×N matrix between the X and Y dimensions can be implemented in a two-dimensional memory block. FIG. 2 illustrates an example of a 16×16 matrix 200. In FIG. 2, N equals 16, and the numbers 0-255 are the 256 elements in matrix 200.

Matrix 200 is transposed as part of the function of the multi-dimensional fast Fourier transform (FFT) engine operating on a processing circuit. The multi-dimensional FFT operation includes a series of FFT engines followed by transpose engines. The FFT engine is an algorithm that performs the functions of a 1D fast Fourier transform. The transpose engine is an algorithm that implements a local X-Y transpose operation. The transpose engine can, for example, generate the memory access patterns for performing the transpose operation of matrix 200 using a single two-dimensional memory block.

Matrix 200 can be transposed, for example, by writing the columns of the matrix in columns of a memory block, and then reading rows of matrix 200 (corresponding to columns of the transposed matrix) from rows of the memory block. In this example, the transpose engine writes columns of matrix 200 to columns of the memory block, and then reads rows of matrix 200 from the rows of the memory block as columns of the transposed matrix. The columns of matrix 200 that are written to lines of storage of the memory block in the Y-dimension are indicated by the number sequences {0, 1, 2, 3, ... 15}, {16, 17, 18, ... 31}, {32, 33, 34, ... 47}, ... {240, 241, ... 255} in FIG. 2. The rows of matrix 200 (which are the columns of the transposed matrix) that are read from lines of storage of the memory block in the X-dimension are indicated by the number sequences {0, 16, 32, 48, ... 240}, {1, 17, 33, 49, ... 241}, {2, 18, 34, 50, ... 242}, ... {15, 31, 47, ... 255} in FIG. 2.

According to some embodiments disclosed herein, multiple transpose engines operate simultaneously in parallel to transpose a matrix using a memory block. Each of the transpose engines writes and reads portions of the matrix to and from segments of the memory block. The transpose engines access the segments of the memory block in parallel. The transpose engines can be implemented by multiple processing circuits, such that each of the transpose engines operates on a different one of the processing circuits.

The transpose engines generate the memory access patterns to write/read to/from the memory block to provide the data that feeds into the FFT engines to implement the functions of a multi-dimensional fast Fourier transform. Each of the FFT engines may, for example, run on a different one of the processing circuits. Multiple FFT engines can improve the overall performance of the FFT by performing multiple 1D fast Fourier transforms in parallel on multiple processing circuits. The FFT engines can operate on the same dimension (either X, Y, or Z), speeding up the compute time to operate on each layer. As other examples, the transpose engines may perform the transpose operation for other types of algorithms.

Figure 3:
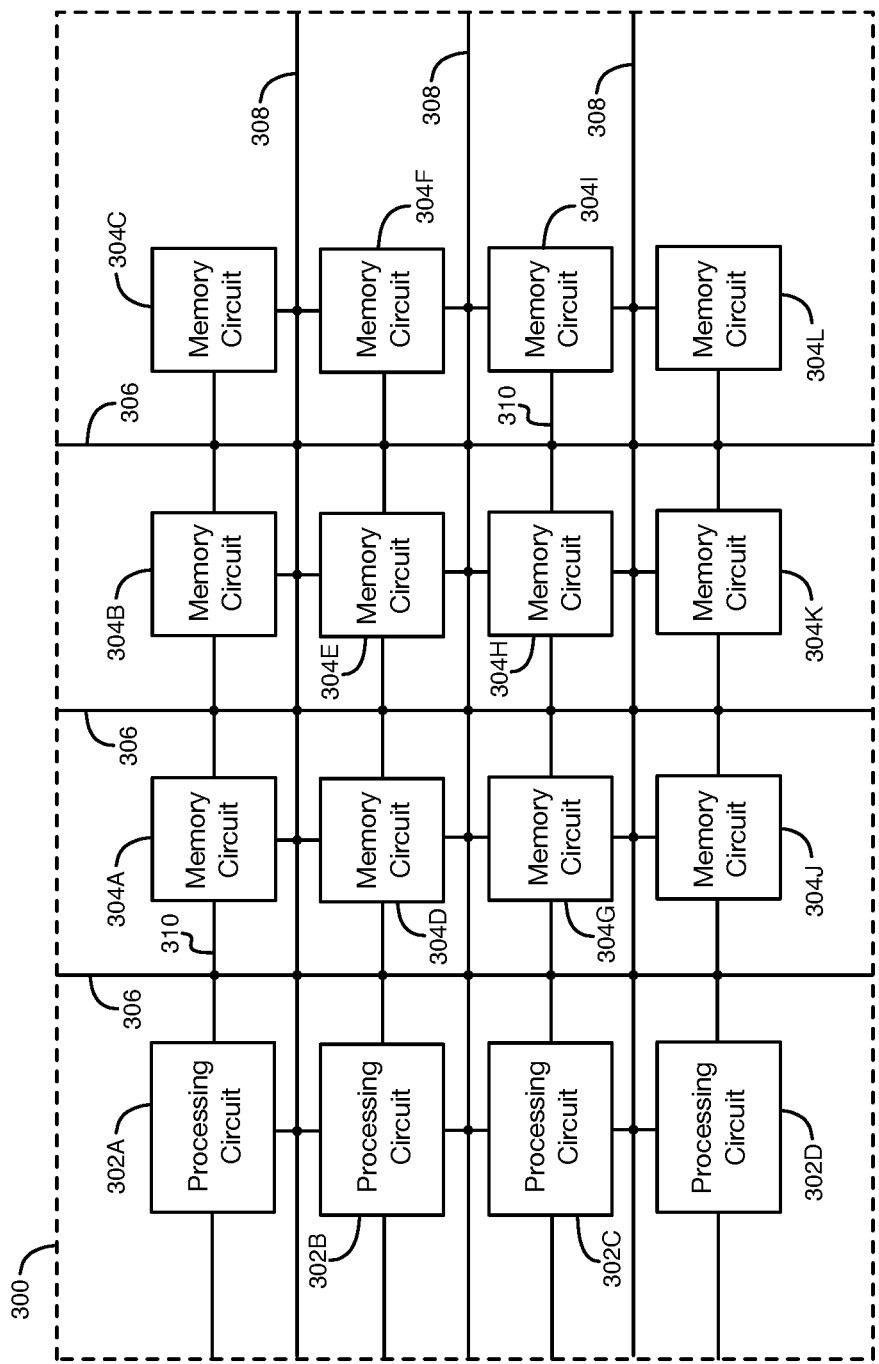
FIG. 3 illustrates an example of a portion of an integrated circuit containing processing circuits and memory circuits that can be used to transpose a matrix, according to an embodiment.

FIG. 3 illustrates an example of a portion of an electronic integrated circuit 300 containing processing circuits 302 and memory circuits 304 that can be used to transpose a matrix, according to an embodiment. Integrated circuit (IC) 300 may be any type of digital IC, such as a programmable logic IC (e.g., an FPGA), a microprocessor, or a graphics processing unit (GPU). Integrated circuit (IC) 300 includes multiple memory circuits 304, such as memory circuits 304A-304L, and multiple processing circuits 302, such as processing circuits 302A-302D. Four processing circuits 302 and 12 memory circuits 304 are shown in FIG. 3 merely as an example. It should be understood that IC 300 can include any number of processing circuits 302 and any number of memory circuits 304. Processing circuits 302 and memory circuits 304 are interconnected by vertical conductors 306, horizontal conductors 308, and local conductors 310, as shown in FIG. 3. Two or more of the processing circuits 302 can perform memory access operations in parallel on one or more of the memory circuits 304 to transpose a matrix as described in further detail below.

Figure 4A:
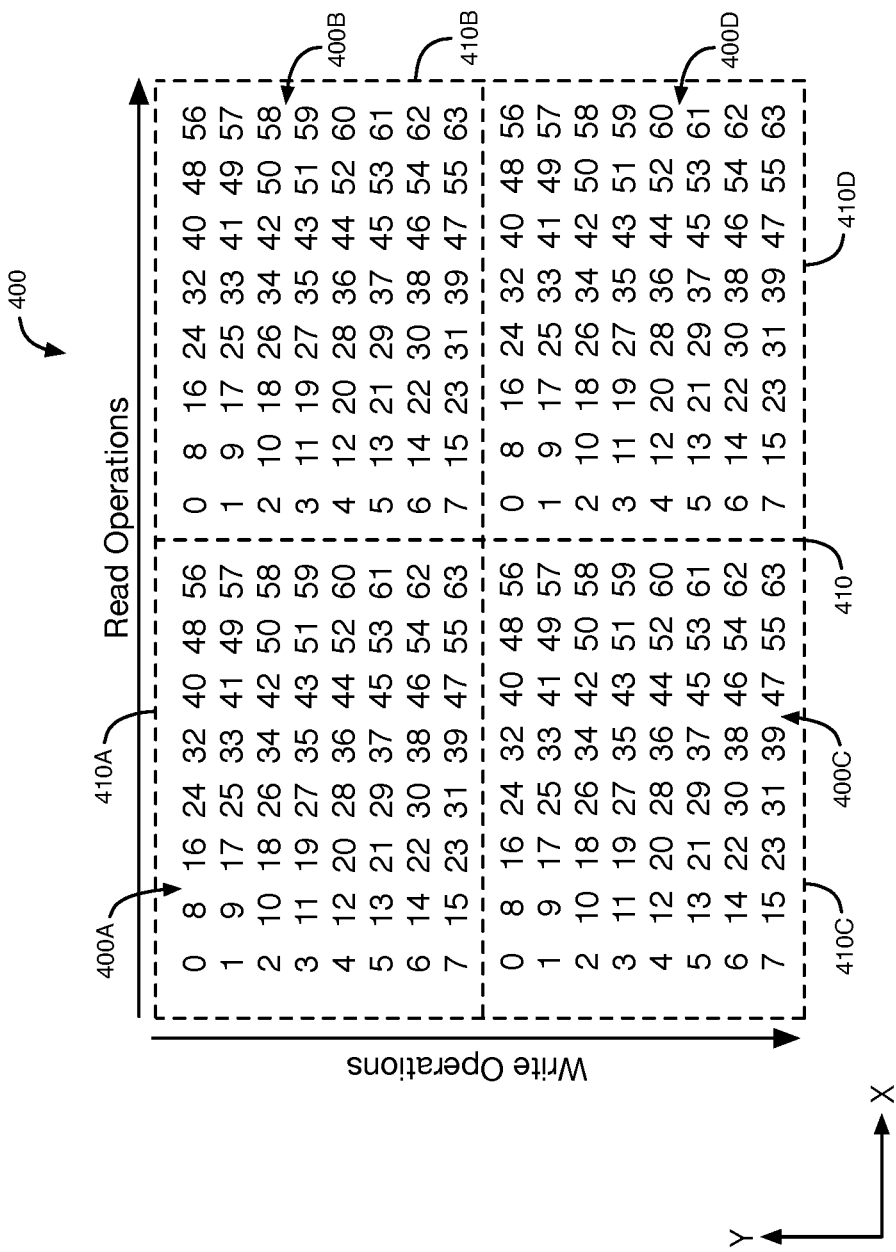
FIG. 4A illustrates an example of a 16×16 matrix that can be transposed by two transpose engines operating in parallel on segments of a memory block, according to an embodiment.

FIG. 4A illustrates an example of a 16×16 matrix 400 that can be transposed by two transpose engines operating in parallel on 4 segments of a memory block 410, according to an embodiment. Matrix 400 includes 256 elements. In FIG. 4A, matrix 400 is divided into four portions 400A-400D. Each of the four portions 400A-400D includes 64 elements of matrix 400. In matrix 400, N equals 16, and the numbers 0-63 are the 64 elements in each of the four portions 400A-400D of matrix 400. Each of the 256 elements of matrix 400 may be stored in one or more memory cells of the memory block 410. Portions 400A-400D may also refer to the transposed matrix as stored in and/or read from the memory block. A 16×16 matrix 400 is disclosed herein merely as an example. It should be understood that the techniques disclosed herein can be used to transpose a matrix of any size (e.g., an N×M matrix).

The elements of matrix 400 and of portions 400A-400D are arranged in rows and columns. The rows of matrix 400 and of portions 400A-400D are the horizontal lines of numbers in the X dimension in FIG. 4A. The columns of matrix 400 and of portions 400A-400D are the vertical lines of numbers in the Y dimension in FIG. 4A. The rows and columns of a matrix (or a portion thereof) are also referred to herein as lines of the matrix.

In the embodiment of FIG. 4A, two transpose engines access one memory block 410 in parallel. A memory block may stall if the same segment of the memory block is accessed simultaneously. The two transpose engines in the embodiment of FIG. 4A prevent the memory block 410 from stalling by concurrently performing write operations and read operations on different segments of the memory block. Because the two transpose engines are operating in parallel, the two transpose engines take half the time to transpose matrix 400 compared to the single transpose engine implementation discussed herein with respect to FIG. 2.

The two transpose engines may, for example, generate the memory access patterns to write/read to/from memory block 410 in order to provide a transposed matrix that feeds into 2 FFT engines that implement the functions of a multi-dimensional fast Fourier transform. Each of the two transpose engines operate on a different processing circuit. For example, the first transpose engine may operate on processing circuit 302A, and the second transpose engine may operate on processing circuit 302B. The first and the second transpose engines concurrently write or read elements of a matrix to or from different segments of a single memory block 410 in parallel to reduce processing time.

FIG. 4A shows a memory block 410 having four segments 410A-410D of the same memory size. The two transpose engines store the elements of matrix 400 in the four segments 410A-410D of memory block 410 in order to transpose matrix 400. Each of the 4 segments 410A-410D stores a quadrant of the matrix 400 and a quadrant of the transposed matrix. The four segments 410A-410D store the 4 portions 400A-400D, respectively, of matrix 400 and of the transposed matrix. One or more of memory circuits 304 of FIG. 3 can, for example, be used to implement memory block 410. As an example, two, three, four, or more of the memory circuits 304 of FIG. 3 can be concatenated together and used as a single memory block 410.

Further details of exemplary transpose operations of matrix 400 using the first and second transpose engines are now described. In the embodiment of FIG. 4A, the first and second transpose engines transpose matrix 400 by writing columns of matrix 400 to memory block 410, and then reading rows of matrix 400 from memory block 410.

The first transpose engine writes columns of portions 400A and 400C of matrix 400 to segments 410A and 410C of memory block 410. The second transpose engine writes columns of portions 400B and 400D of matrix 400 to segments 410B and 410D of memory block 410. In an exemplary embodiment, the first transpose engine writes each 16-element column of portions 400A and 400C of matrix 400 to a single line of storage aligned in the Y-dimension in segments 410A and 410C of memory block 410, and the second transpose engine writes each 16-element column of portions 400B and 400D of matrix 400 to a single line of storage aligned in the Y-dimension in segments 410B and 410D of memory block 410. The first transpose engine writes each column of portions 400A and 400C of matrix 400 to segments 410A and 410C concurrently and in parallel with the second transpose engine writing a column of portions 400B and 400D of matrix to segments 410B and 410D.

For example, the write operations in the Y-dimension are performed such that the first transpose engine writes column 1 {0, 1, 2, 3, . . . , 7} of portion 400A to segment 410A and column 1 {0, 1, 2, 3, . . . 7} of portion 400C to segment 410C at the same time that the second transpose engine writes column 1 {0, 1, 2, 3, . . . , 7} of portion 400B to segment 410B and column 1 {0, 1, 2, 3, . . . 7} of portion 400D to segment 410D. Next, the first transpose engine writes column 2 {8, 9, 10, 11, . . . 15} of portion 400A to segment 410A and column 2 {8, 9, 10, 11, . . . 15} of portion 400C to segment 410C at the same time that the second transpose engine writes column 2 {8, 9, 10, 11, . . . 15} of portion 400B to segment 410B and column 2 {8, 9, 10, 11, . . . 15} of portion 400D to segment 410D. The first and second transpose engines write a column of matrix 400 to each pair of the portions 400A/400C and 400B/400D, respectively, in parallel. The first and second transpose engines write the additional columns of matrix 400 to the 4 segments of memory block 410 until all of the columns of matrix 400 have been written to memory block 410.

Subsequently, the first transpose engine reads rows of portions 400A and 400B of matrix 400 from segments 410A and 410B of memory block 410. The second transpose engine reads rows of portions 400C and 400D of matrix 400 from segments 410C and 410D of memory block 410. In an exemplary embodiment, the first transpose engine reads each 16-element row of portions 400A and 400B of matrix 400 from a single line of storage aligned in the X-dimension in segments 410A and 410B of memory block 410, and the second transpose engine reads each 16-element row of portions 400C and 400D of matrix 400 from a single line of storage aligned in the X-dimension in segments 410C and 410D of memory block 410. The first transpose engine reads each row of portions 400A and 400B of matrix 400 from segments 410A and 410B concurrently and in parallel with the second transpose engine reading a row of portions 400C and 400D of matrix 400 from segments 410C and 410D. The rows of matrix 400 read from memory block 410 are the columns of the transposed matrix.

The read operations of the rows of matrix 400 in the X-dimension are performed such that the first transpose engine reads row 1 {0, 8, 16, . . . 56} of portion 400A from segment 410A and row 1 {0, 8, 16, . . . 56} of portion 400B from segment 410B at the same time that the second transpose engine reads row 1 {0, 8, 16, . . . 56} of portion 400C from segment 410C and row 1 {0, 8, 16, . . . 56} of portion 400D from segment 410D. Next, the first transpose engine reads row 2 {1, 9, 17, . . . 57} of portion 400A from segment 410A and row 2 {1, 9, 17, . . . 57} of portion 400B from segment 410B at the same time that the second transpose engine reads row 2 {1, 9, 17, . . . 57} of portion 400C from segment 410C and row 2 {1, 9, 17, . . . 57} of portion 400D from segment 410D.

The first and second transpose engines read a row of the matrix from each pair of portions 400A-400B and 400C-400D, respectively, in parallel. The first and second transpose engines read additional rows of the matrix from the memory block 410 until all of the rows of the matrix have been read from memory block 410. The transpose of matrix 400 is then complete.

Figure 4B:
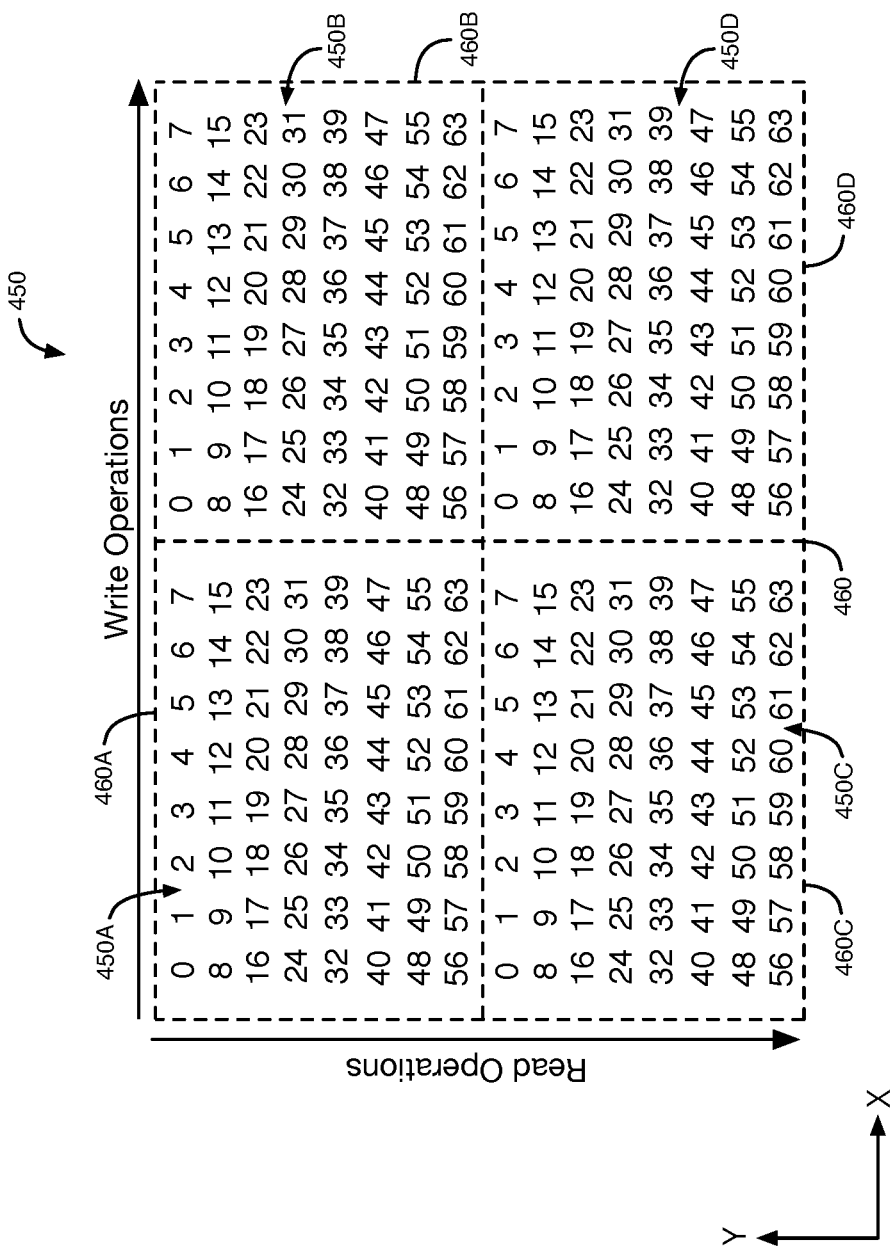
FIG. 4B illustrates another example of a 16×16 matrix that can be transposed by two transpose engines operating in parallel on segments of a memory block, according to an embodiment.

According to some embodiments, first and second transpose engines can transpose a matrix by writing rows of the matrix to different segments of a memory block, and then reading columns of the matrix from different segments of the memory block. FIG. 4B illustrates an example of a 16×16 matrix 450 that can be transposed in this manner using a memory block 460. In the embodiment of FIG. 4B, the first transpose engine write rows of first and second quadrants 450A and 450B of matrix 450 to segments 460A and 460B of memory block 460, and the second transpose engine writes rows of third and fourth quadrants 450C and 450D of matrix 450 to segments 460C and 460D of memory block 460. In an exemplary embodiment, the first transpose engine writes each 16-element row of quadrants 450A and 450B of matrix 450 to a single line of storage aligned in the X-dimension in segments 460A and 460B of memory block 460, and the second transpose engine writes each 16-element row of quadrants 450C and 450D of matrix 450 to a single line of storage aligned in the X-dimension in segments 460C and 460D of memory block 460. The first transpose engine writes each row of the quadrants 450A and 450B of matrix 450 to segments 460A and 460B concurrently and in parallel with the second transpose engine writing a row of the quadrants 450C and 450D of matrix 450 to segments 410C and 410D.

Subsequently, the first transpose engine reads columns of quadrants 450A and 450C of matrix 450 from segments 460A and 460C of memory block 460, and the second transpose engine reads columns of quadrants 450B and 450D of matrix 450 from segments 460B and 460D of memory block 460. In an exemplary embodiment, the first transpose engine reads each 16-element column of quadrants 450A and 450C of matrix 450 from a single line of storage aligned in the Y-dimension in segments 460A and 460C of memory block 460, and the second transpose engine reads each 16-element column of quadrants 450B and 450D of matrix 450 from a single line of storage aligned in the Y-dimension in segments 460B and 460D of memory block 460. The first transpose engine reads each column of quadrants 450A and 450C of the matrix 450 from segments 460A and 460C concurrently and in parallel with the second transpose engine reading a column of quadrants 450B and 450D of the matrix 450 from segments 460B and 460D. The columns of matrix 450 read from memory block 460 are the rows of the transposed matrix.

Each of the write operations of an entire column or row of a matrix to a memory block may, for example, be performed in a single clock cycle to reduce access time. Each of the read operations of an entire row or column of a matrix from memory may, for example, be performed in a single clock cycle to reduce access time.

Figure 5:
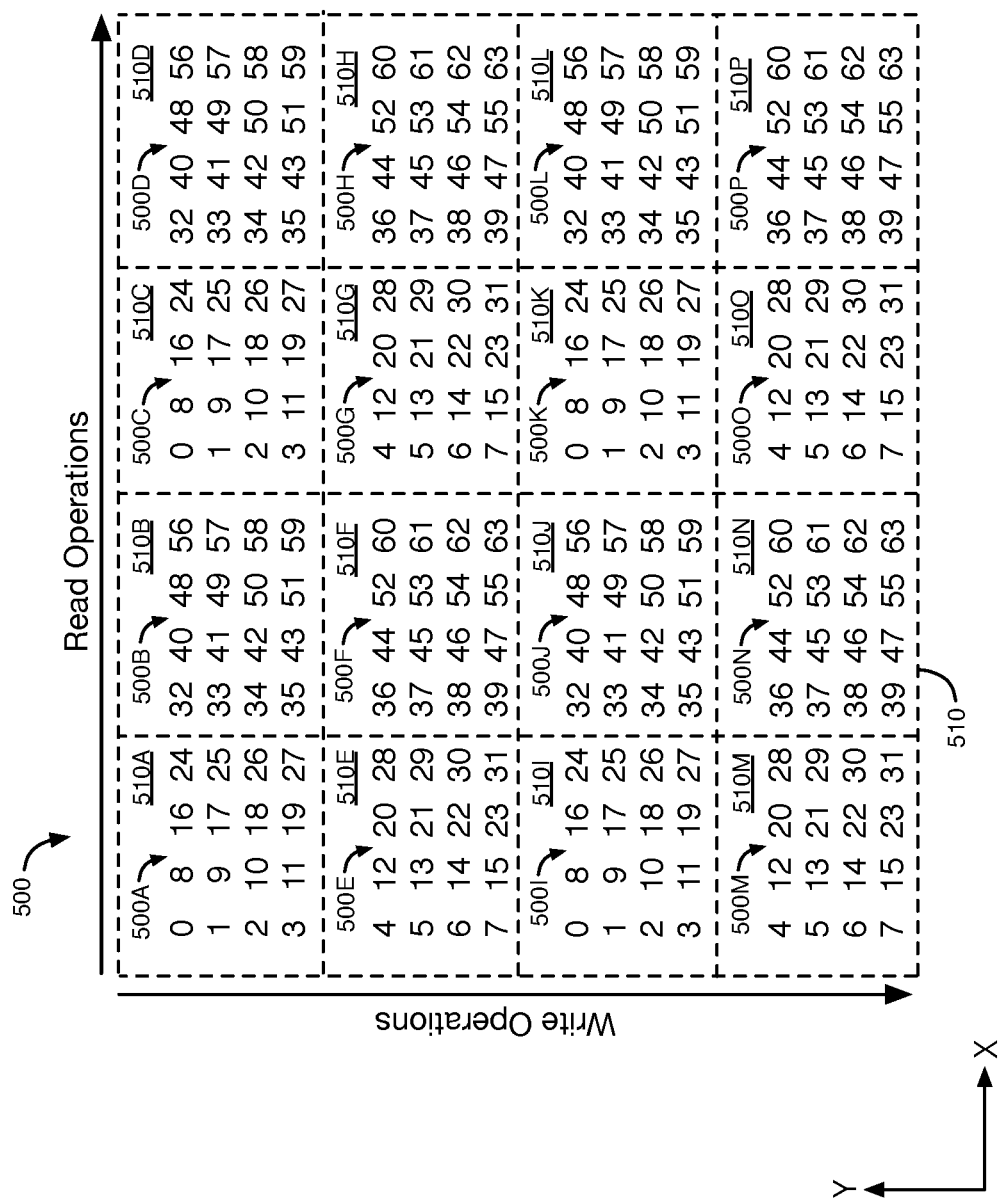
FIG. 5 illustrates an example of a 16×16 matrix that can be transposed by four transpose engines operating in parallel on segments of a memory block, according to an embodiment.

FIG. 5 illustrates another example of a 16×16 matrix 500 that can be transposed by four transpose engines operating in parallel on 16 segments of a memory block 510, according to an embodiment. Matrix 500 includes 256 elements. In FIG. 5, matrix 500 is divided into 16 portions 500A-500P. Each of the 16 portions 500A-500P includes 16 elements of matrix 500. In matrix 500, N equals 16, and the numbers 0-63 are the 64 different elements of matrix 500 that are stored in each of the four quadrants of matrix 500. Each of the 256 elements of matrix 500 may be stored in one or more memory cells of the memory block 510. Portions 500A-500P may also refer to the transposed matrix as stored in and/or read from the memory block 510. A 16×16 matrix 500 is disclosed herein merely as an example. It should be understood that the techniques disclosed herein can be used to transpose a matrix of any size (e.g., an N×M matrix).

The elements of matrix 500 and of portions 500A-500P are arranged in rows and columns. The rows of matrix 500 and of portions 500A-500P are the horizontal lines of numbers in the X dimension in FIG. 5. The columns of matrix 500 and of portions 500A-500P are the vertical lines of numbers in the Y dimension in FIG. 5. The rows and columns of a matrix (or a portion thereof) are also referred to herein as lines of the matrix.

In the embodiment of FIG. 5, four transpose engines access memory block 510 in parallel by simultaneously performing write operations or read operations on different segments of the memory block to prevent the memory block from stalling. The 4 transpose engines write or read elements of matrix 500 to or from different segments of memory block 510 in parallel to reduce processing time. Because the 4 transpose engines are operating in parallel, the transpose engines of FIG. 5 take one-fourth the time to transpose matrix 500 compared to the single transpose engine implementation discussed herein with respect to FIG. 2.

The 4 transpose engines may, for example, generate the memory access patterns to write/read to/from memory block 510 in order to provide a transposed matrix that feeds into 4 FFT engines that implement the functions of a multi-dimensional fast Fourier transform. Each of the 4 transpose engines operates on a different processing circuit. For example, the 4 transpose engines may operate on processing circuits 302A-302D.

FIG. 5 shows a memory block 510 having 16 segments 510A-510P. The 4 transpose engines store elements of matrix 500 in segments 510A-510P of memory block 510 in order to transpose matrix 500. Each of the 16 segments 510A-510P stores a portion of matrix 500 and the transposed matrix. The 16 segments 510A-510P store the 16 portions 500A-500P, respectively, of matrix 500 and the transposed matrix. Memory block 510 may, for example, include one, two, three, four, or more of the memory circuits 304 of FIG. 3. Each of the segments 510A-510P may be a separate memory circuit or part of a larger memory circuit that includes one or more of the other segments 510A-510P.

Further details of exemplary transpose operations of matrix 500 using the 4 transpose engines are now described. According to some embodiments, the 4 transpose engines transpose matrix 500 by writing columns of matrix 500 to memory block 510, and then reading rows of the matrix from memory block 510.

The first transpose engine writes columns of portions 500A, 500E, 500I, and 500M of matrix 500 to segments 510A, 510E, 510I, and 510M of memory block 510. The second transpose engine writes columns of portions 500B, 500F, 500J, and 500N of matrix 500 to segments 510B, 510F, 510J, and 510N of memory block 510. The third transpose engine writes columns of portions 500C, 500G, 500K, and 500O of matrix 500 to segments 510C, 510G, 510K, and 510O of memory block 510. The fourth transpose engine writes columns of portions 500D, 500H, 500L, and 500P of matrix 500 to segments 510D, 510H, 510L, and 510P of memory block 510. In an exemplary embodiment, the first, second, third, and fourth transpose engines write each 16-element column of matrix 500 (e.g., column 0, 1, . . . 7, 0, 1, . . . 7) to a single line of storage aligned in the Y-dimension in memory block 510. Each of the first, second, third, and fourth transpose engines writes a column of matrix 500 to memory block 510 concurrently and in parallel with the other 3 transpose engines writing 3 of the other columns of matrix 500 to memory block 510.

Subsequently, the first transpose engine reads rows of portions 500A-500D of matrix 500 from segments 510A-510D. The second transpose engine reads rows of portions 500E-500H of matrix 500 from segments 510E-510H. The third transpose engine reads rows of portions 500I-500L of matrix 500 from segments 510I-510L. The fourth transpose engine reads rows of portions 500M-500P of matrix 500 from segments 510M-510P. In an exemplary embodiment, the first, second, third, and fourth transpose engines read each 16-element row of matrix 500 from a single line of storage aligned in the X-dimension in memory block 510. Each of the first, second, third, and fourth transpose engines reads a row of the matrix 500 from memory block 510 concurrently and in parallel with the other 3 transpose engines reading 3 of the other rows of the matrix from memory block 510. The rows of matrix 500 read from memory block 510 are the columns of the transposed matrix.

According to another embodiment, the 4 transpose engines transpose matrix 500 by writing rows of matrix 500 to memory block 510, and then reading columns of the matrix 500 from memory block 510.

Figure 6:
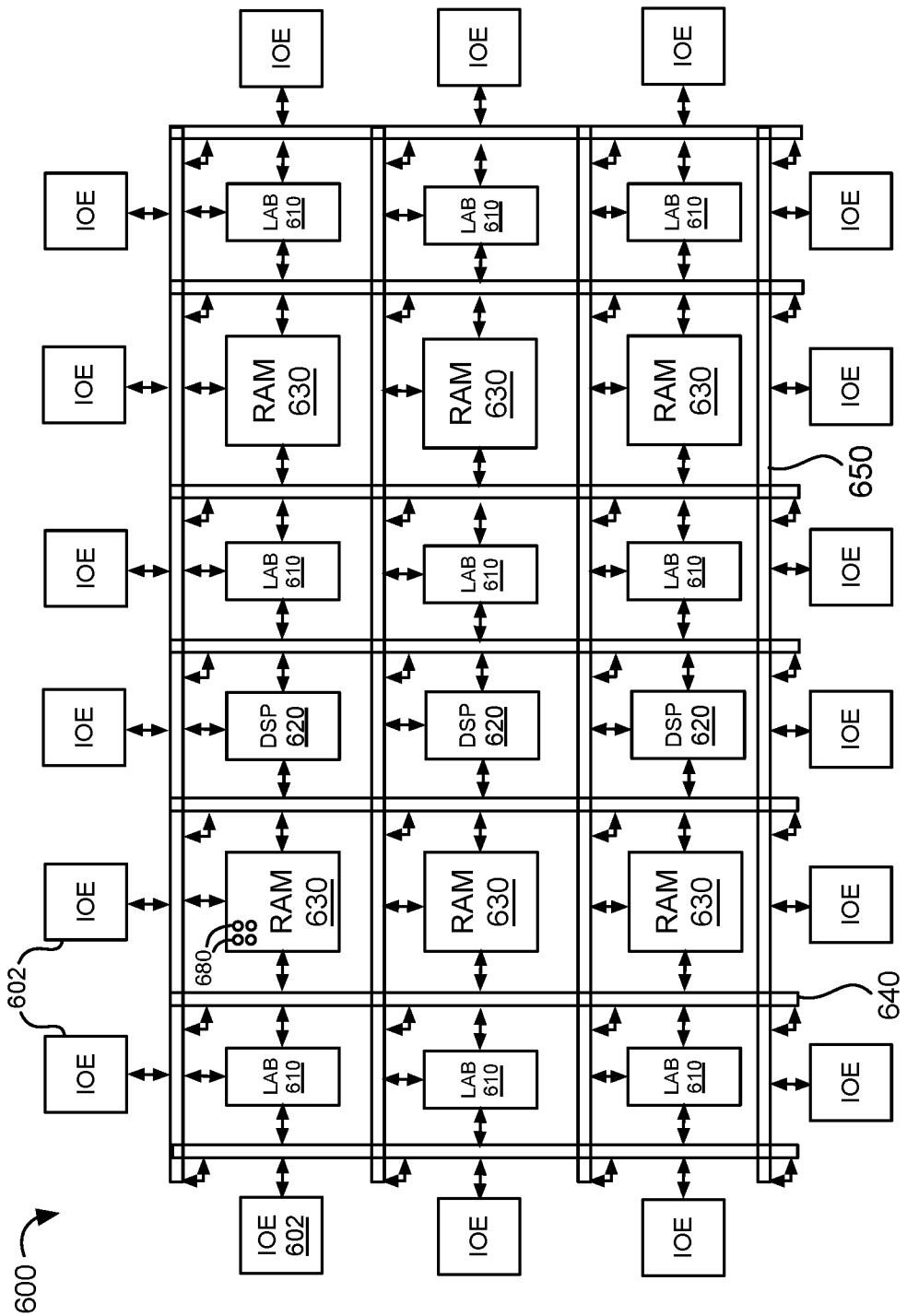
FIG. 6 illustrates an exemplary embodiment of a programmable logic integrated circuit (IC) that can implement embodiments disclosed herein.

FIG. 6 illustrates an exemplary embodiment of a programmable logic integrated circuit (IC) 600 that may implement embodiments disclosed herein. As shown in FIG. 6, the programmable logic integrated circuit (IC) 600 includes a two-dimensional array of configurable functional circuit blocks, including configurable logic array blocks (LABs) 610 and other functional circuit blocks, such as random access memory (RAM) blocks 630 and digital signal processing (DSP) blocks 620. Functional blocks such as LABs 610 may include smaller configurable regions of logic circuits (e.g., logic elements, logic blocks, or adaptive logic modules) that receive input signals and perform custom logic functions on the input signals to produce output signals, including, for example, combinatorial and sequential functions. One or more of the RAM blocks 630 may be used to implement memory block 410, 460, and/or 510. Each of the RAM blocks 630 may include one or more memory circuits. One or more of DSP blocks 620 and/or one or more of the LABs 610 may be used to implement each of the transpose engines and each of the processing circuits disclosed herein.

Each of the RAM blocks 630 can be organized in an array of memory cells (such as memory cells 680) that includes rows and columns. A data register that spans across all columns and an address register that spans across all rows may receive input data. The input data may be shifted onto the data register. When the appropriate address register is asserted, the data register writes the input data to the memory cells 680 of the row of the array that was designated by the address register.

In addition, programmable IC 600 has input/output elements (IOEs) 602 for driving signals off of programmable IC 600 and for receiving signals from other devices. Each of the IOEs 602 includes one or more input buffers, one or more output buffers, and one or more IO pads. Input/output elements 602 may include parallel input/output circuitry, serial data transceiver circuitry, differential receiver and transmitter circuitry, or other circuitry used to connect one integrated circuit to another integrated circuit. As shown, input/output elements 602 may be located around the periphery of the chip. If desired, the programmable IC 600 may have input/output elements 602 arranged in different ways. For example, input/output elements 602 may form one or more columns, rows, or islands of input/output elements that may be located anywhere on the programmable IC 600.

The programmable IC 600 also includes programmable interconnect circuitry in the form of vertical routing channels 640 (i.e., interconnects formed along a vertical axis of programmable IC 600) and horizontal routing channels 650 (i.e., interconnects formed along a horizontal axis of programmable IC 600), each routing channel including at least one track to route at least one wire.

Note that other routing topologies, besides the topology of the interconnect circuitry depicted in FIG. 6, may be used. For example, the routing topology may include wires that travel diagonally or that travel horizontally and vertically along different parts of their extent as well as wires that are perpendicular to the device plane in the case of three dimensional integrated circuits.

Furthermore, it should be understood that embodiments disclosed herein may be implemented in any integrated circuit or electronic system. If desired, the functional blocks of such an integrated circuit may be arranged in more levels or layers in which multiple functional blocks are interconnected to form still larger blocks. Other device arrangements may use functional blocks that are not arranged in rows and columns.

Programmable IC 600 also contains programmable memory elements (e.g., in RAMs 630 or in LABs 610). The programmable memory elements can be loaded with configuration data via input/output elements (IOEs) 602. Once loaded, the programmable memory elements each provide a corresponding static control signal that controls the operation of a logic circuit in an associated configurable functional block (e.g., LABs 610, DSP blocks 620, RAM blocks 630, and/or input/output elements 602).

In a typical scenario, the outputs of the loaded programmable memory elements are applied to the gates of metal oxide semiconductor field effect transistors (MOSFETs) in functional blocks (e.g., any of LAB blocks 610, DSP blocks 620, and RAM blocks 630) to turn certain transistors on or off and thereby configure the logic circuits in the functional blocks including the routing paths. Configurable logic circuit elements that can be controlled in this way include parts of multiplexers (e.g., multiplexers used for forming routing paths in interconnect circuits) and logic circuitry in LABs 610 and DSP blocks 620 such as look-up tables, logic arrays, AND, OR, NAND, and NOR logic gates, pass gates, etc.

In certain embodiments, programmable IC 600 can include configuration memory that is organized in sectors, whereby a sector may include the configuration RAM bits that specify the functions and/or interconnections of the subcomponents and wires in or crossing that sector. Each sector can include separate data and address registers and configurable logic circuits.

The programmable IC 600 of FIG. 6 is merely one example of an IC that can include embodiments disclosed herein. The embodiments disclosed herein can be incorporated into any suitable integrated circuit or system. For example, the embodiments disclosed herein can be incorporated into numerous types of devices such as processor integrated circuits, central processing units, memory integrated circuits, graphics processing unit integrated circuits, application specific standard products (ASSPs), application specific integrated circuits (ASICs), and programmable logic integrated circuits. Examples of programmable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The integrated circuits disclosed in one or more embodiments herein may be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

Figure 7:
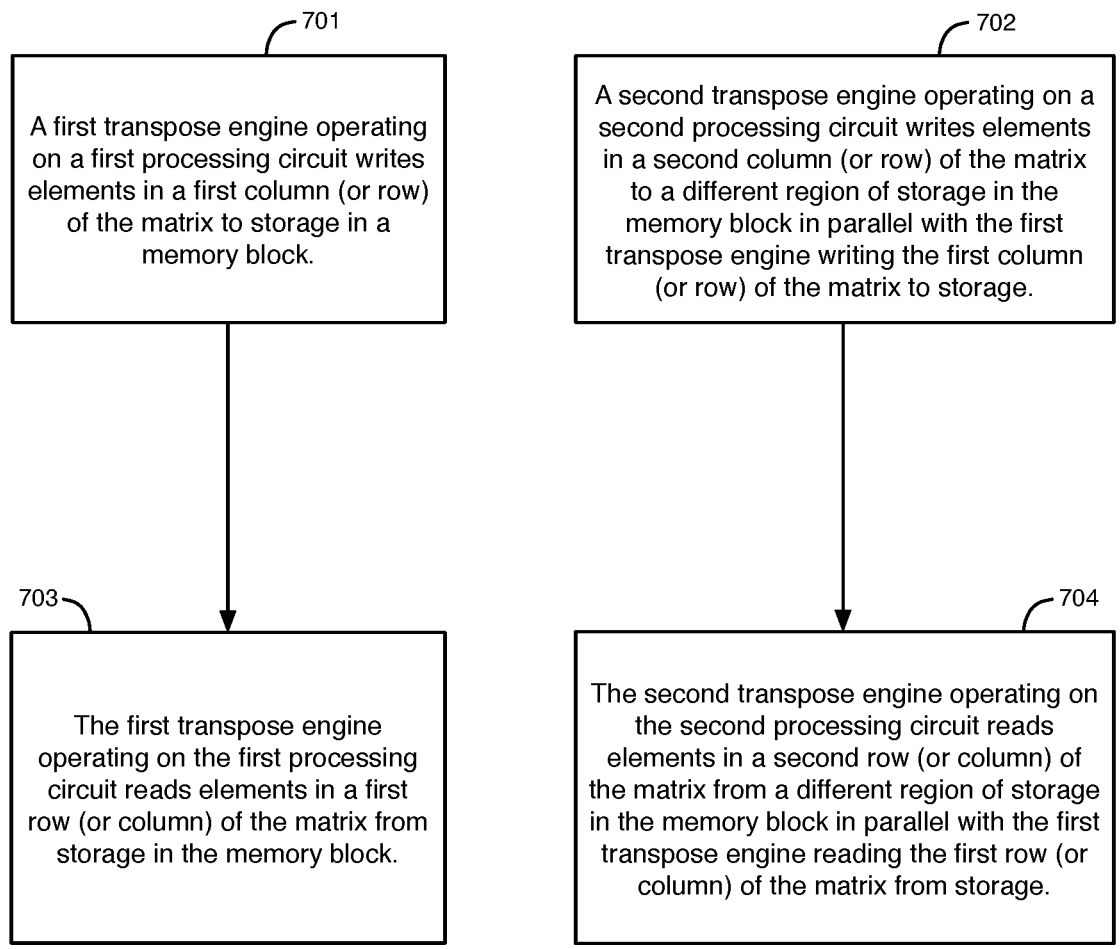
FIG. 7 illustrates examples of operations that can be performed to transpose a matrix using a memory block and processing circuits, according to an embodiment.

FIG. 7 illustrates examples of operations that can be performed to transpose a matrix to generate a transposed matrix using a memory block and processing circuits, according to an embodiment. In the embodiment of FIG. 7, operations 701 and 702 operate in parallel, and operations 703 and 704 operate in parallel. In operation 701, a first transpose engine operating on a first processing circuit writes elements in a first column (or row) of the matrix to storage in a memory block. For example, the first transpose engine of FIG. 4A writes elements in a first column of matrix 400 to storage in segments 410A and 410C of memory block 410. In operation 702, a second transpose engine operating on a second processing circuit writes elements in a second column (or row) of the matrix to a different region of storage in the memory block in parallel with the first transpose engine writing the first column (or row) of the matrix to storage. For example, the second transpose engine of FIG. 4A writes elements in a second column of matrix 400 to storage in segments 410B and 410D of memory block 410 in parallel with the first transpose engine writing the first column of matrix 400 to storage in segments 410A and 410C of memory block 410.

In operation 703, the first transpose engine operating on the first processing circuit reads elements in a first row (or column) of the matrix from storage in the memory block. For example, the first transpose engine of FIG. 4A reads elements in a first row of matrix 400 from storage in segments 410A and 410B of memory block 410. In operation 704, the second transpose engine operating on the second processing circuit reads elements in a second row (or column) of the matrix from a different region of storage in the memory block in parallel with the first transpose engine reading the first row (or column) of the matrix from storage. For example, the second transpose engine of FIG. 4A reads elements in a second row of matrix 400 from storage in segments 410C and 410D of memory block 410 in parallel with the first transpose engine reading the first row of matrix 400 from storage in segments 410A and 410B. The first and second rows of matrix 400 read from memory block 410 are the columns of the transposed matrix.

The following examples pertain to further embodiments. Example 1 is an integrated circuit comprising: a memory block; a first processing circuit that writes elements in a first column or row of a matrix to a first region of storage in the memory block; and a second processing circuit that writes elements in a second column or row of the matrix to a second region of storage in the memory block, wherein the first and second processing circuits write the first and second columns or rows of the matrix to the first and second regions of storage in parallel, wherein the first and second processing circuits transpose the matrix to generate a transposed matrix by reading first and second columns or rows of the transposed matrix from third and fourth regions of storage, respectively, in the memory block in parallel.

In Example 2, the integrated circuit of Example 1 can optionally further comprise: a third processing circuit that writes elements in a third column or row of the matrix to a fifth region of storage in the memory block; and a fourth processing circuit that writes elements in a fourth column or row of the matrix to a sixth region of storage in the memory block, wherein the first, second, third, and fourth processing circuits write the first, second, third, and fourth columns or rows of the matrix to the first, second, fifth, and sixth regions of storage in parallel.

In Example 3, the integrated circuit of Example 2 can optionally include, wherein the first, second, third, and fourth processing circuits transpose the matrix by the first, second, third, and fourth processing circuits reading the first, the second, third, and fourth columns or rows of the transposed matrix from the third, the fourth, seventh, and eighth regions of storage, respectively, in the memory block in parallel, and wherein the first, second, fifth, and sixth regions of storage are perpendicular to the third, fourth, seventh, and eighth regions of storage in the memory block.

In Example 4, the integrated circuit of Example 1 can optionally include, wherein the first processing circuit writes elements in a third column or row of the matrix to a fifth region of storage in the memory block, wherein the second processing circuit writes elements in a fourth column or row of the matrix to a sixth region of storage in the memory block, and wherein the first and second processing circuits write the third and fourth columns or rows of the matrix to the fifth and sixth regions of storage in parallel.

In Example 5, the integrated circuit of Example 4 can optionally include, wherein the integrated circuit transposes the matrix by the first and second processing circuits reading third and fourth columns or rows of the transposed matrix from seventh and eighth regions of storage, respectively, in the memory block in parallel, and wherein the first, second, fifth, and sixth regions of storage are perpendicular to the third, fourth, seventh, and eighth regions of storage in the memory block.

In Example 6, the integrated circuit of Example 5 can optionally further comprise: a third processing circuit that writes elements in a fifth column or row of the matrix to a ninth region of storage in the memory block; and a fourth processing circuit that writes elements in a sixth column or row of the matrix to a tenth region of storage in the memory block, wherein the first, second, third, and fourth processing circuits write the first, second, fifth, and sixth columns or rows of the matrix to the first, second, ninth and tenth regions of storage in parallel.

In Example 7, the integrated circuit of Example 6 can optionally include, wherein the first, second, third, and fourth processing circuits transpose the matrix by the first, second, third, and fourth processing circuits reading the first, the second, fifth, and sixth columns or rows of the transposed matrix from the third, the fourth, eleventh, and twelfth regions of storage, respectively, in the memory block in parallel, and wherein the ninth and tenth regions of storage are perpendicular to the eleventh and twelfth regions of storage in the memory block.

In Example 8, the integrated circuit of Example 1 can optionally include, wherein the first and second columns or rows of the matrix are perpendicular to the first and second columns or rows of the transposed matrix.

In Example 9, the integrated circuit of Example 3 can optionally include, wherein the first, second, third, and fourth columns or rows of the matrix are perpendicular to the first, second, third, and fourth columns or rows of the transposed matrix.

Example 10 is a method for transposing a matrix to generate a transposed matrix, the method comprising: writing elements in a first column or row of the matrix to a first region of storage in a memory block using a first transpose engine operating on a first processing circuit; writing elements in a second column or row of the matrix to a second region of storage in the memory block using a second transpose engine operating on a second processing circuit in parallel with the first transpose engine writing the first column or row of the matrix to storage; reading elements in a first column or row of the transposed matrix from a third region of storage in the memory block using the first transpose engine operating on the first processing circuit; and reading elements in a second column or row of the transposed matrix from a fourth region of storage in the memory block using the second transpose engine operating on the second processing circuit in parallel with the first transpose engine reading the first column or row of the transposed matrix from storage.

In Example 11, the method of Example 10 can optionally further comprise: writing elements in a third column or row of the matrix to a fifth region of storage in the memory block using a third transpose engine operating on a third processing circuit; and writing elements in a fourth column or row of the matrix to a sixth region of storage in the memory block using a fourth transpose engine operating on a fourth processing circuit, wherein the first, second, third, and fourth transpose engines write the elements in the first, second, third, and fourth columns or rows of the matrix to the first, second, fifth, and sixth regions of storage, respectively, in parallel.

In Example 12, the method of Example 11 can optionally further comprise: reading elements in a third column or row of the transposed matrix from a seventh region of storage in the memory block using the third transpose engine operating on the third processing circuit; and reading elements in a fourth column or row of the transposed matrix from an eighth region of storage in the memory block using the fourth transpose engine operating on the fourth processing circuit in parallel with the third transpose engine reading the third column or row of the transposed matrix from storage, wherein the first, second, fifth, and sixth regions of storage are perpendicular to the third, fourth, seventh, and eighth regions of storage in the memory block.

In Example 13, the method of Example 10 can optionally further comprise: writing elements in a third column or row of the matrix to a fifth region of storage in the memory block using the first transpose engine operating on the first processing circuit; and writing elements in a fourth column or row of the matrix to a sixth region of storage in the memory block using the second transpose engine operating on the second processing circuit in parallel with the first transpose engine writing the third column or row of the matrix to storage.

In Example 14, the method of Example 13 can optionally further comprise: reading elements in a third column or row of the transposed matrix from a seventh region of storage in the memory block using the first transpose engine operating on the first processing circuit; and reading elements in a fourth column or row of the transposed matrix from an eighth region of storage in the memory block using the second transpose engine operating on the second processing circuit in parallel with the first transpose engine reading the third column or row of the transposed matrix from storage, and wherein the first, second, fifth, and sixth regions of storage are perpendicular to the third, fourth, seventh, and eighth regions of storage in the memory block.

In Example 15, the method of Example 14 can optionally further comprise: writing elements in a fifth column or row of the matrix to a ninth region of storage in the memory block using a third transpose engine operating on a third processing circuit; and writing elements in a sixth column or row of the matrix to a tenth region of storage in the memory block using a fourth transpose engine operating on a fourth processing circuit, wherein the first, second, third, and fourth transpose engines write the elements in the first, second, fifth, and sixth columns or rows of the matrix to the first, second, ninth and tenth regions of storage in parallel.

Example 16 is a circuit system comprising: a memory block; and first and second processing circuits, wherein the first and second processing circuits store a matrix in the memory block by the first processing circuit writing a first row or column of the matrix to a first region of storage in the memory block concurrently with the second processing circuit writing a second row or column of the matrix to a second region of storage in the memory block, and wherein the first and second processing circuits transpose the matrix to generate a transposed matrix by the first processing circuit reading a first row or column of the transposed matrix from a third region of storage in the memory block concurrently with the second processing circuit reading a second row or column of the transposed matrix from a fourth region of storage in the memory block.

In Example 17, the circuit system of Example 16 can optionally further comprise: third and fourth processing circuits, wherein the first, second, third, and fourth processing circuits store the matrix in the memory block by concurrently writing the first, the second, third, and fourth rows or columns of the matrix to the first, the second, fifth, and sixth regions of storage in the memory block, respectively.

In Example 18, the circuit system of Example 17 can optionally further include, wherein the first, second, third, and fourth processing circuits transpose the matrix by concurrently reading the first, the second, third, and fourth rows or columns of the transposed matrix from the third, the fourth, seventh, and eighth regions of storage in the memory block, respectively, and wherein the first, second, fifth, and sixth regions of storage are perpendicular to the third, fourth, seventh, and eighth regions of storage in the memory block.

In Example 19, the circuit system of Example 16 can optionally further include, wherein the first and second processing circuits store the matrix in the memory block by the first processing circuit writing a third row or column of the matrix to a fifth region of storage in the memory block concurrently with the second processing circuit writing a fourth row or column of the matrix to a sixth region of storage in the memory block.

In Example 20, the circuit system of Example 19 can optionally further include, wherein the first and second processing circuits transpose the matrix by the first processing circuit reading a third row or column of the transposed matrix from a seventh region of storage in the memory block concurrently with the second processing circuit reading a fourth row or column of the transposed matrix from an eighth region of storage in the memory block, and wherein the first, second, fifth, and sixth regions of storage are perpendicular to the third, fourth, seventh, and eighth regions of storage in the memory block.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit comprising:
   a memory block;
   a first processing circuit operating a first transpose engine that writes elements in a first column or row of a matrix to a first region of storage in the memory block; and
   a second processing circuit operating a second transpose engine that writes elements in a second column or row of the matrix to a second region of storage in the memory block, wherein the first and the second transpose engines write the first and the second columns or rows of the matrix to the first and the second regions of storage in parallel, and
   wherein the first and the second transpose engines transpose the matrix to generate a transposed matrix by reading first and second columns or rows of the transposed matrix from third and fourth regions of storage, respectively, in the memory block in parallel.

2. The integrated circuit of claim 1 further comprising:
   a third processing circuit operating a third transpose engine that writes elements in a third column or row of the matrix to a fifth region of storage in the memory block; and
   a fourth processing circuit operating a fourth transpose engine that writes elements in a fourth column or row of the matrix to a sixth region of storage in the memory block, wherein the first, the second, the third, and the fourth transpose engines write the first, the second, the third, and the fourth columns or rows of the matrix to the first, the second, the fifth, and the sixth regions of storage in parallel.

3. The integrated circuit of claim 2, wherein the first, the second, the third, and the fourth transpose engines transpose the matrix by the first, the second, the third, and the fourth transpose engines reading the first, the second, third, and fourth columns or rows of the transposed matrix from the third, the fourth, seventh, and eighth regions of storage, respectively, in the memory block in parallel.

4. The integrated circuit of claim 3, wherein the first, the second, the third, and the fourth columns or rows of the matrix are perpendicular to the first, the second, the third, and the fourth columns or rows of the transposed matrix.

5. The integrated circuit of claim 1, wherein the first transpose engine writes elements in a third column or row of the matrix to a fifth region of storage in the memory block, wherein the second transpose engine writes elements in a fourth column or row of the matrix to a sixth region of storage in the memory block, and wherein the first and the second transpose engines write the third and the fourth columns or rows of the matrix to the fifth and the sixth regions of storage in parallel.

6. The integrated circuit of claim 5, wherein the integrated circuit transposes the matrix by the first and the second transpose engines reading third and fourth columns or rows of the transposed matrix from seventh and eighth regions of storage, respectively, in the memory block in parallel.

7. The integrated circuit of claim 6 further comprising:
a third processing circuit operating a third transpose engine that writes elements in a fifth column or row of the matrix to a ninth region of storage in the memory block; and
a fourth processing circuit operating a fourth transpose engine that writes elements in a sixth column or row of the matrix to a tenth region of storage in the memory block, wherein the first, the second, the third, and the fourth transpose engines write the first, the second, the fifth, and the sixth columns or rows of the matrix to the first, the second, the ninth and the tenth regions of storage in parallel.

8. The integrated circuit of claim 7, wherein the first, the second, the third, and the fourth transpose engines transpose the matrix by the first, the second, the third, and the fourth transpose engines reading the first, the second, fifth, and sixth columns or rows of the transposed matrix from the third, the fourth, eleventh, and twelfth regions of storage, respectively, in the memory block in parallel, and wherein the first, the second, the fifth, the sixth, the ninth, and the tenth regions of storage are perpendicular to the third, the fourth, the seventh, the eighth, the eleventh, and the twelfth regions of storage in the memory block.

9. The integrated circuit of claim 1, wherein the first and the second columns or rows of the matrix are perpendicular to the first and the second columns or rows of the transposed matrix.

10. A method for transposing a matrix to generate a transposed matrix, the method comprising:
writing elements in a first column or row of the matrix to a first region of storage in a memory block using a first transpose engine operating on a first processing circuit;
writing elements in a second column or row of the matrix to a second region of storage in the memory block using a second transpose engine operating on a second processing circuit in parallel with the first transpose engine writing the first column or row of the matrix to the first region of storage;
reading elements in a first column or row of the transposed matrix from a third region of storage in the memory block using the first transpose engine operating on the first processing circuit; and
reading elements in a second column or row of the transposed matrix from a fourth region of storage in the memory block using the second transpose engine operating on the second processing circuit in parallel with the first transpose engine reading the first column or row of the transposed matrix from the third region of storage.

11. The method of claim 10 further comprising:
writing elements in a third column or row of the matrix to a fifth region of storage in the memory block using a third transpose engine operating on a third processing circuit; and
writing elements in a fourth column or row of the matrix to a sixth region of storage in the memory block using a fourth transpose engine operating on a fourth processing circuit, wherein the first, the second, the third, and the fourth transpose engines write the elements in the first, the second, the third, and the fourth columns or rows of the matrix to the first, the second, the fifth, and the sixth regions of storage, respectively, in parallel.

12. The method of claim 11 further comprising:
reading elements in a third column or row of the transposed matrix from a seventh region of storage in the memory block using the third transpose engine operating on the third processing circuit; and
reading elements in a fourth column or row of the transposed matrix from an eighth region of storage in the memory block using the fourth transpose engine operating on the fourth processing circuit in parallel with the third transpose engine reading the third column or row of the transposed matrix from the seventh region of storage.

13. The method of claim 10 further comprising:
writing elements in a third column or row of the matrix to a fifth region of storage in the memory block using the first transpose engine operating on the first processing circuit; and
writing elements in a fourth column or row of the matrix to a sixth region of storage in the memory block using the second transpose engine operating on the second processing circuit in parallel with the first transpose engine writing the third column or row of the matrix to the fifth region of storage.

14. The method of claim 13 further comprising:
reading elements in a third column or row of the transposed matrix from a seventh region of storage in the memory block using the first transpose engine operating on the first processing circuit; and
reading elements in a fourth column or row of the transposed matrix from an eighth region of storage in the memory block using the second transpose engine operating on the second processing circuit in parallel with the first transpose engine reading the third column or row of the transposed matrix from the seventh region of storage.

15. The method of claim 14 further comprising:
writing elements in a fifth column or row of the matrix to a ninth region of storage in the memory block using a third transpose engine operating on a third processing circuit; and
writing elements in a sixth column or row of the matrix to a tenth region of storage in the memory block using a fourth transpose engine operating on a fourth processing circuit, wherein the first, the second, the third, and the fourth transpose engines write the elements in the first, the second, the fifth, and the sixth columns or rows of the matrix to the first, the second, the ninth, and the tenth regions of storage in parallel.

16. A circuit system comprising:
a memory block; and
first and second processing circuits, wherein first and second transpose engines operating on the first and the second processing circuits store a matrix in the memory block by the first transpose engine writing a first row or column of the matrix to a first region of storage in the memory block concurrently with the second transpose engine writing a second row or column of the matrix to a second region of storage in the memory block, and
wherein the first and the second transpose engines transpose the matrix to generate a transposed matrix by the first transpose engine reading a first row or column of the transposed matrix from a third region of storage in the memory block concurrently with the second transpose engine reading a second row or column of the transposed matrix from a fourth region of storage in the memory block.

17. The circuit system of claim 16 further comprising:
third and fourth processing circuits, wherein the first transpose engine, the second transpose engine, a third transpose engine operating on the third processing circuit, and a fourth transpose engine operating on the fourth processing circuit store the matrix in the memory block by concurrently writing the first, the second, third, and fourth rows or columns of the matrix to the first, the second, fifth, and sixth regions of storage in the memory block, respectively.

18. The circuit system of claim 17, wherein the first, second, the third, and the fourth transpose engines transpose the matrix by concurrently reading the first, the second, third, and fourth rows or columns of the transposed matrix from the third, the fourth, seventh, and eighth regions of storage in the memory block, respectively, and
wherein the first, the second, the fifth, and the sixth regions of storage are aligned in a first dimension, and wherein the third, the fourth, the seventh, and the eighth regions of storage are aligned in a second dimension perpendicular to the first dimension in the memory block.

19. The circuit system of claim 16, wherein the first and the second transpose engines store the matrix in the memory block by the first transpose engine writing a third row or column of the matrix to a fifth region of storage in the memory block concurrently with the second transpose engine writing a fourth row or column of the matrix to a sixth region of storage in the memory block.

20. The circuit system of claim 19, wherein the first and the second transpose engines transpose the matrix by the first transpose engine reading a third row or column of the transposed matrix from a seventh region of storage in the memory block concurrently with the second transpose engine reading a fourth row or column of the transposed matrix from an eighth region of storage in the memory block.

* * * * *